US009600459B2

(12) United States Patent
Keohane et al.

(10) Patent No.: US 9,600,459 B2
(45) Date of Patent: Mar. 21, 2017

(54) VISUAL MACRO SHOWING HOW SOME ICON OR OBJECT OR TEXT WAS CONSTRUCTED

(75) Inventors: Susann Marie Keohane, Austin, TX (US); Gerald Francis McBrearty, Austin, TX (US); Jessica Carol Murillo, Round Rock, TX (US); Johnny Meng-Han Shieh, Austin, TX (US); Shawn Patrick Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 2084 days.

(21) Appl. No.: 12/173,830

(22) Filed: Jul. 16, 2008

(65) Prior Publication Data

US 2010/0017693 A1 Jan. 21, 2010

(51) Int. Cl.
G06F 17/00 (2006.01)
G06F 17/24 (2006.01)
G06F 17/30 (2006.01)

(52) U.S. Cl.
CPC .......... G06F 17/24 (2013.01); G06F 17/3089 (2013.01)

(58) Field of Classification Search
CPC .......................... G06F 11/3414; G06F 17/3089
USPC ...................................................... 715/201
See application file for complete search history.

(56) References Cited

U.S. PATENT DOCUMENTS

| 5,838,313 | A  | * | 11/1998 | Hou ...................... G06F 17/241 715/201 |
| 6,134,563 | A  | * | 10/2000 | Clancey ................ G06F 17/247 706/45 |
| 6,434,547 | B1 | * | 8/2002  | Mishelevich et al. |
| 7,627,821 | B2 | * | 12/2009 | Klementiev .................. 715/704 |
| 7,653,896 | B2 | * | 1/2010  | Herdeg, III ................... 717/113 |
| 2003/0007397 | A1 | * | 1/2003 | Kobayashi ............. G06F 17/24 365/200 |
| 2004/0017390 | A1 |   | 1/2004 | Knowlton et al. |
| 2004/0243931 | A1 | * | 12/2004 | Stevens ..................... G06F 8/38 715/236 |
| 2005/0039119 | A1 |   | 2/2005 | Parks et al. |
| 2005/0197804 | A1 | * | 9/2005 | Reeves ......................... 702/187 |
| 2005/0216838 | A1 | * | 9/2005 | Graham ............... G06F 3/1206 715/713 |
| 2006/0026561 | A1 | * | 2/2006 | Bauman et al. ............. 717/114 |
| 2007/0084370 | A1 | * | 4/2007 | Kuroda ............ G06F 17/30011 101/404 |
| 2007/0239762 | A1 | * | 10/2007 | Farahbod ................. G06F 8/35 |
| 2008/0005652 | A1 | * | 1/2008 | Krishnaswamy ...... G06Q 10/10 715/203 |
| 2008/0021876 | A1 | * | 1/2008 | Ahern ................... G06F 9/4436 |
| 2008/0022919 | A1 | * | 1/2008 | Ohnstad ................ G08B 15/02 116/201 |

(Continued)

OTHER PUBLICATIONS

Macros in Word & Excel, Center for Teaching and Learning, University of Illinois, Springfield; Oct. 26, 2000, pp. 1-8, http://www.dsoergel.com/690/Tutorials/Macros/Macros.pdf.*

Primary Examiner — Laurie Ries

(74) Attorney, Agent, or Firm — Yee & Associates, P.C.; Damion Josephs

(57) ABSTRACT

A Visual Macro Program records and replays desired actions performed by a user in creating or editing a document. The recorded actions are appended to the document as an attachment that can be replayed by a user at a later time by enabling a tag associated with the recorded actions.

20 Claims, 2 Drawing Sheets

(56) References Cited

U.S. PATENT DOCUMENTS

| | | | |
|---|---|---|---|
| 2008/0040657 A1* | 2/2008 | Kuznetsov | G06F 17/227 715/234 |
| 2008/0168546 A1* | 7/2008 | Almeida | G06F 21/41 726/6 |
| 2008/0172598 A1* | 7/2008 | Jacobsen | G06F 17/243 715/224 |
| 2008/0288449 A1* | 11/2008 | Kim | G06F 17/30905 |
| 2009/0006984 A1* | 1/2009 | Bhagat | G06Q 10/10 715/760 |
| 2009/0113333 A1* | 4/2009 | Dellinger et al. | 715/771 |
| 2009/0222726 A1* | 9/2009 | Kintzley | 715/704 |
| 2009/0327953 A1* | 12/2009 | Honkala | G06F 3/04817 715/804 |

* cited by examiner

VISUAL MACRO SHOWING HOW SOME ICON OR OBJECT OR TEXT WAS CONSTRUCTED

FIELD OF THE INVENTION

The present invention relates generally to recording and replaying actions performed by a user when creating or editing a document, and specifically to recalling the actions performed in creating a specific icon, text or object within a document.

BACKGROUND OF THE INVENTION

Documents such as presentations, data sheets, and word files are created for various business and personal purposes. A variety of applications can be used to create such documents. Often, users share such documents with other users. Such other users may want to edit, borrow, or recreate features or aspects of the shared document to customize it for their specific needs. Such features could, for example, be an object such as a Table, an Organization chart, or a Venn diagram in a Microsoft Word™ document. Likewise, the features may be a background or layout in a presentation, an icon on a display, or other text or visual content created by the user in a document. However, the users may not have enough familiarity with the application to edit, borrow, or recreate the features of a particular document. Similarly, with the passage of time, the creator of the document may find it difficult to remember how certain features in the document were created.

Some applications provide "help options" where the user can enter a text query and search for results. The search results generated by such applications are traditionally in the form of a text or an animated show. However, these applications rely on the appropriateness of the user's query and are often in the form of a generic tutorial, without regard to the exact need of the user. Moreover, a user without sufficient knowledge of the application may find difficulty in entering appropriate queries and thus, may not get the desired results. Other applications automatically create an object based on a user's query, but they do not record the query used to create the object for later retrieval.

Thus, a need exists for an application that can teach or remind a user how an object, text or icon in a document was created.

SUMMARY OF THE INVENTION

The Visual Macro Program (VMP) records actions performed by a user while creating or editing a document. Once recording is concluded, the VMP creates a tag and stores the recorded actions in a file associated with the document. A user may subsequently access and play back the set of recorded actions by activating the tag.

BRIEF DESCRIPTION OF DRAWINGS

The novel features believed characteristic of the invention are set forth in the appended claims. The invention itself, as well as a preferred mode of use, further objectives, and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as a Visual Macro Program ("VMP").

Figure 1:
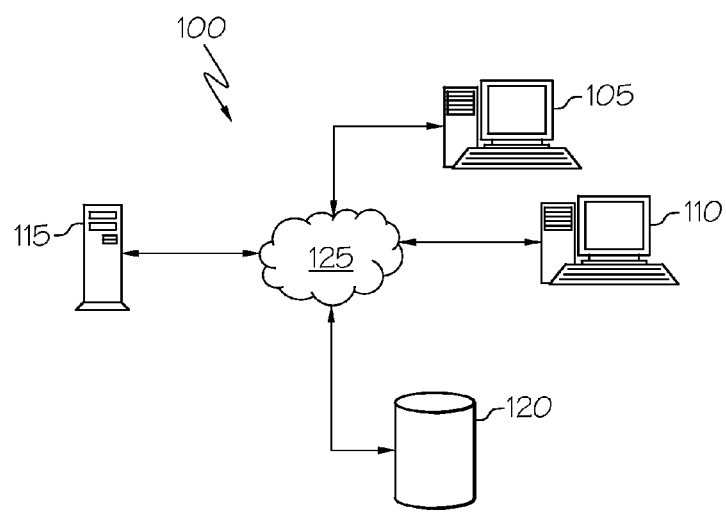
FIG. 1 depicts an exemplary computer network system.

Additionally, the Visual Macro Program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including nodes for a workstation computer 105, a workstation computer 110, a server computer 115, and a persistent storage 120. A Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
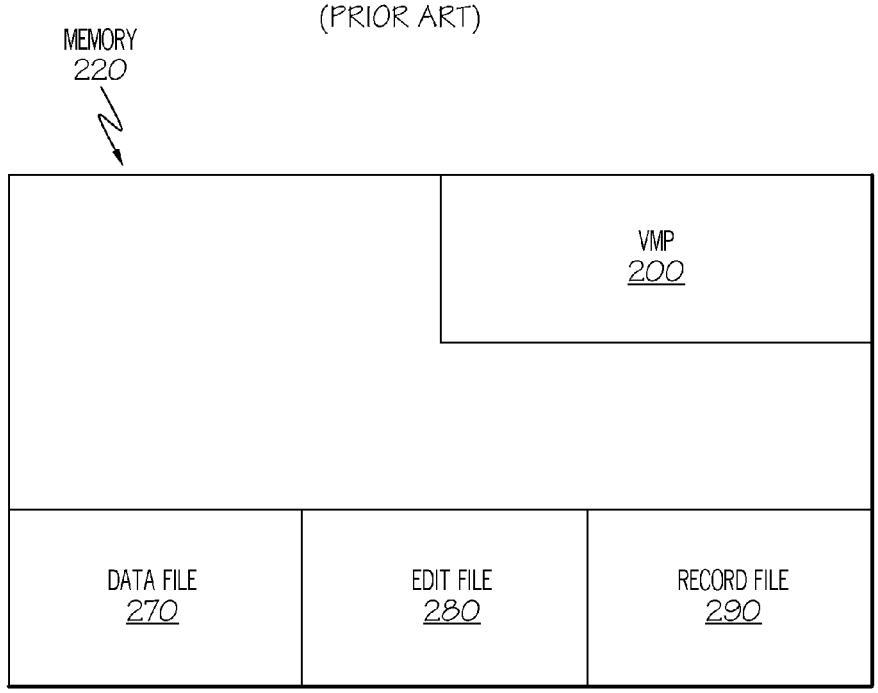
FIG. 2 depicts a computer memory containing the VMP and data files.

Referring to FIG. 2, The Visual Macro Program, illustrated as VMP 200, is typically stored in a memory 220. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, VMP 200 may reside in more than one memory distributed across different computers, servers, logical partitions, or other hardware devices. The elements depicted in memory 220 may be located in or distributed across separate memories in any combination, and VMP 200 may be adapted to identify, locate, and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to VMP 200, memory 220 includes a "Data File" 270, an "Edit File" 280, and a "Record File" 290.

VMP 200 provides a method and computerized software system for recording and replaying desired actions of a user when he creates an object, an icon or an edit in a document. A user may replay or review the recorded actions at a later time to review how the object, icon or edit within the document was created.

Figure 3:
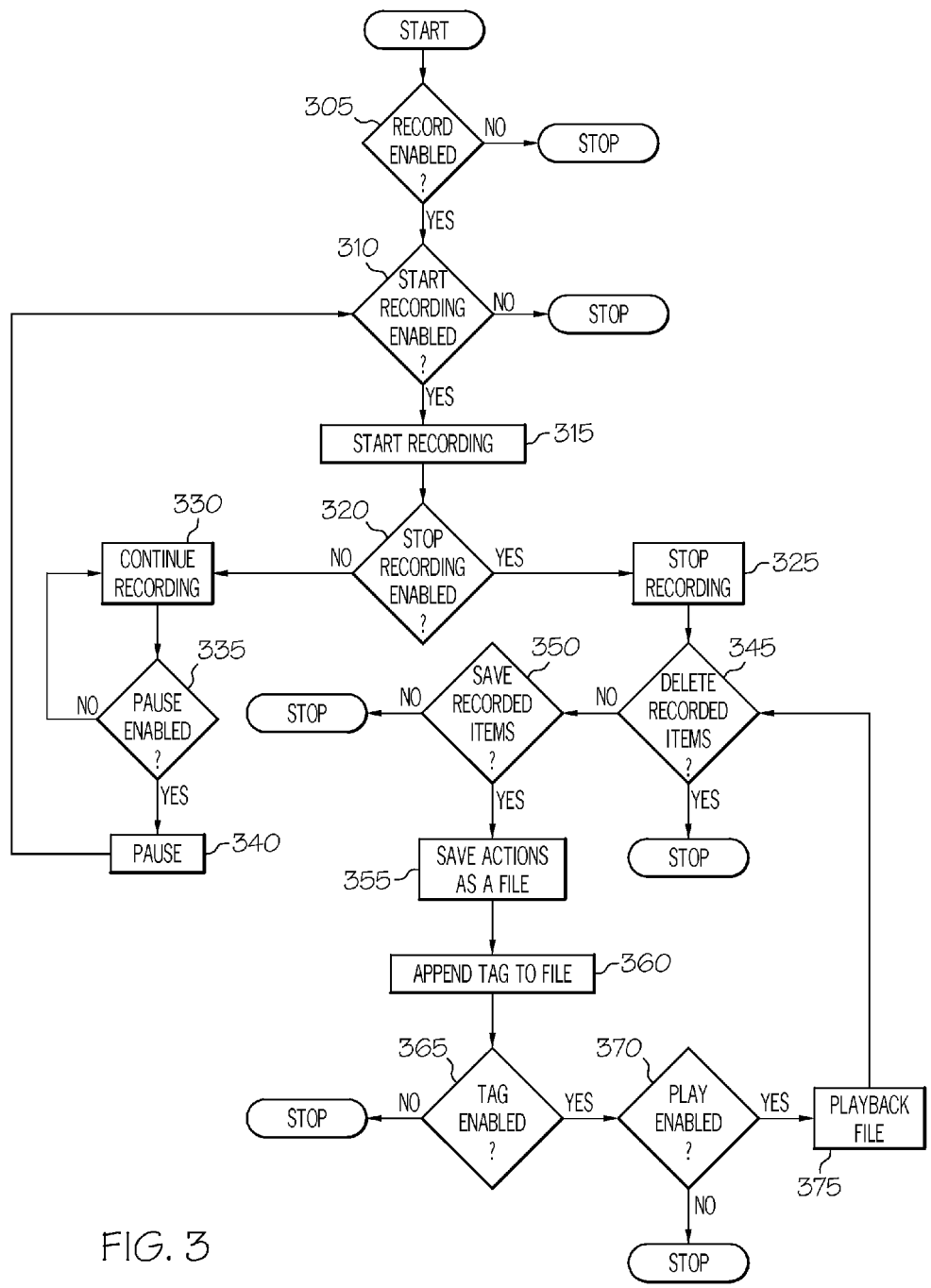
FIG. 3 depicts a method of using the VMP.

An exemplary method of using VMP 200 is shown in FIG. 3. A user is provided with an option to enable a record mode (305) in the application associated with a document. When the user enables this option, for instance by clicking an applicable button in a toolbar (not shown), additional tools such as start recording, stop recording, and pause may be displayed. Upon selection of the Start recording tool (310) by the user, the actions performed by the user are thereafter recorded (315). When the user selects the Stop recording tool (320), the process of recording the actions is terminated (325). Thereafter, the user may be provided with an option to save (350) or delete (345) the recorded actions. If the user selects the option to save the recorded actions (350), the recorded actions are saved as a file (355). In another embodiment, the recorded action may automatically be saved as a file (355) when the user selects the Stop recording tool (325) without the need for user intervention. In either event, the saved file could be a visible attachment to the document or it could be a hidden from view. Regardless, this saved file corresponds with and is attached to the document (355). A user can record multiple actions following the steps described above. A tag is appended to each saved file (360) that acts as an interface between the attachment and the user. The tag may be displayed at a position close to the object or a position selected by the user. Wherever placed, the tag ultimately serves as an reference for the saved file.

When the document is opened by a user at a later time, the user can enable the tag (365) by, for example, clicking on the tag. Enabling the tag (365) displays a toolbar offering options such as Play, Stop, Pause, and Set playback speed. When the user selects the Play option (370), playback of the previously recorded actions begins (375). The playback repeats actions that are saved in the file attached to the document. The playback speed may be the same as the speed of actual actions or it may be controlled by the user. The foregoing will show the user how the corresponding feature, object or icon in the document was created. It would be understood by those skilled in the art that the playback could include a textual listing of the recorded actions or an animated/screen-shot version of the recorded steps.

For example, a user may want to record the actions performed during creation of a Venn diagram with four circles in a Microsoft Word™ document (not shown). In order to do so, the user enables the record mode by clicking on a Record button in a toolbar of the VMP 200. Thereafter, the user selects the Start recording tool to initiate the recording of the user's actions. In this Venn diagram example, these user actions may include selecting a standard Microsoft Word™ Insert menu, selecting a Diagram sub-menu, selecting a Venn diagram object, and clicking on an Insert shape tool in the Diagram sub-menu of Microsoft Word™ (not shown). When the user selects the Stop recording tool of the VMP 200, the recording stops and the recorded actions are saved as a file. The saving of the file may be automatic upon the termination of the recording, or it may be a user selectable option. The VMP 200 forms a tag corresponding to the actions required to create the Venn diagram and associates the tag with the Venn Diagram. When the Microsoft Word™ document is subsequently opened, the tag is visible to the user. Clicking on the tag and selecting the Play option causes a playback of the recorded actions from the file. In this example, the VMP 200 would play back the actions of selecting the Insert menu, the Diagram sub-menu, the Venn diagram object, and clicking on the Insert shape tool in the Diagram sub-menu of the Microsoft Word™ document.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way expect by proper construction of the following claims.

What is claimed:

1. A computer implemented method for recording a set of actions performed on a feature in a document, the computer implemented method comprising:
   a computer receiving a first indication to start a recording;
   the computer recording a set of actions to create the feature in the document;
   the computer receiving a second indication to stop recording the set of actions, whereupon recording is stopped;
   the computer storing the set of actions as a set of recorded actions;
   the computer creating a tag and associating the tag with both the set of recorded actions and the document, the tag configured to be displayed on the document in proximity to the feature;
   the computer displaying, responsive to a next opening of the document, the tag on the document in proximity to a location of the feature in the document, wherein the tag serves as a reference for accessing the set of recorded actions;
   activating the tag displayed on the document; and
   the computer accessing and playing back, responsive to the activation of the tag, the set of recorded actions using the tag as the reference to access the set of recorded actions.

2. The computer implemented method of claim 1, wherein the feature is an object.

3. The computer implemented method of claim 2, wherein the object is a graphical object.

4. The computer implemented process of claim 1, wherein the feature is an icon.

5. The computer implemented process of claim 1, wherein the computer displaying the tag on the document in proximity to the feature further comprises a visual indicator appearing in the document at a location where the recorded set of actions were initiated; and further comprising: the computer displaying a toolbar offering options of starting, stopping, pausing, resuming, and setting a playback speed of the recorded set of actions.

6. The computer implemented process of claim 1, wherein the set of recorded actions can be copied and reused in another document.

7. The computer implemented method of claim 1 wherein the feature is one of a table, an organization chart, and a Venn diagram.

8. A computer program product for causing a computer to record a set of actions performed on a feature of a document, the computer program product comprising:
   one or more non-transitory computer-readable storage devices;
   program instructions stored on at least one of the one or more non-transitory computer-readable storage devices for receiving a first indication from the user to start a recording;
   program instructions stored on at least one of the one or more non-transitory computer-readable storage devices for recording a set of actions to create the feature in the document;
   program instructions stored on at least one of the one or more non-transitory computer-readable storage devices for receiving a second indication to stop recording the set of actions, whereupon recording is stopped;
   program instructions stored on at least one of the one or more non-transitory computer-readable storage devices for storing the set of actions as a set of recorded actions;
   program instructions stored on at least one of the one or more non-transitory computer-readable storage devices for creating a tag and associating the tag with both the set of recorded actions and the document, the tag configured to be displayed on the document in proximity to the feature;
   program instructions stored on at least one of the one or more non-transitory computer-readable storage devices for displaying, responsive to a next opening of the document, the tag on the document in proximity to the feature in the document, wherein the tag serves as a reference for accessing the set of recorded actions;
   program instructions stored on at least one of the one or more non-transitory computer-readable storage devices for activating the tag displayed on the document; and
   program instructions stored on at least one of the one or more non-transitory computer-readable storage devices for accessing and playing back, responsive to the activation of the tag, the set of recorded actions using the tag as the reference to access the set of recorded actions.

9. The computer program product of claim 8, wherein the feature is an object.

10. The computer program product of claim 9, wherein the object is a graphical object.

11. The computer program product of claim 8, wherein the feature is an icon.

12. The computer program product of claim 11, wherein displaying the tag on the document in proximity to the feature further comprises a visual indicator appearing in the document at a location where the recorded set of actions were initiated; and further comprising computer program instructions stored in the computer-readable storage device for displaying a toolbar offering options of starting, stopping, pausing, resuming, and setting a playback speed of the recorded set of actions.

13. The computer program product of claim 12, wherein the set of recorded actions can be copied and reused in another document.

14. The computer program product of claim 8, wherein the feature is one of a table, an organization chart, and a Venn diagram.

15. A programmable apparatus for causing a computer to record a set of actions performed on a feature in a document using a computer application, the programmable apparatus comprising:
   one or more processors, one or more computer-readable storage devices, and one or more computer readable memories;
   program instructions stored on at least one of the one or more computer-readable storage devices for execution by at least one of the one or more processors via at least one of the one or more memories for receiving a first indication to start a recording;
   program instructions stored on at least one of the one or more computer-readable storage devices for execution by at least one of the one or more processors via at least one of the one or more memories for recording a set of actions to create the feature in the document;
   program instructions stored on at least one of the one or more computer-readable storage devices for execution by at least one of the one or more processors via at least one of the one or more memories for receiving a second indication to stop recording the set of actions, whereupon recording is stopped;
   program instructions stored on at least one of the one or more computer-readable storage devices for execution by at least one of the one or more processors via at least one of the one or more memories for storing the set of actions as a set of recorded actions;
   program instructions stored on at least one of the one or more computer-readable storage devices for execution by at least one of the one or more processors via at least one of the one or more memories for creating a tag and associating the tag with both the set of recorded actions and the document, the tag configured to be displayed on the document in proximity to the feature;
   program instructions stored on at least one of the one or more computer-readable storage devices for execution by at least one of the one or more processors via at least one of the one or more memories for displaying, responsive to a next opening of the document, the tag on the document in proximity to the feature in the document, wherein the tag serves as a reference for accessing the set of recorded actions;
   program instructions stored on at least one of the one or more non-transitory computer-readable storage devices for activating the tag displayed on the document; and
   program instructions stored on at least one of the one or more computer-readable storage devices for execution by at least one of the one or more processors via at least one of the one or more memories for accessing and playing back, responsive to the activation of the tag, the set of recorded actions using the tag as the reference to access the set of recorded actions.

16. The programmable apparatus of claim 15, wherein displaying the tag on the document in proximity to the feature further comprises a visual indicator appearing in the document at a location where the recorded set of actions were initiated; and further comprising computer program instructions stored in at least one of the one or more computer-readable storage device for execution by at least one of the one or more processors via at least one of the one or memories for displaying a toolbar offering options of starting, stopping, pausing, resuming, and setting a playback speed of the recorded set of actions.

17. The programmable apparatus of claim 15, wherein the feature is an object.

18. The programmable apparatus of claim 17, wherein the object is a graphical object.

19. The programmable apparatus of claim 15, wherein the feature is an icon.

20. The programmable apparatus of claim 15 wherein the feature is one of a table, an organization chart, and a Venn diagram.

\* \* \* \* \*